United States Patent [19]

Kumatani

[11] Patent Number: 4,557,360
[45] Date of Patent: Dec. 10, 1985

[54] MOVABLE DISC FOR ELECTROMAGNETIC CLUTCH/BRAKE

[75] Inventor: Hiroshi Kumatani, Nagoya, Japan

[73] Assignee: Mitsubishi Denki Kabushiki Kaisha, Tokyo, Japan

[21] Appl. No.: 469,698

[22] Filed: Feb. 25, 1983

[30] Foreign Application Priority Data

Feb. 26, 1982 [JP]  Japan .................................. 57-30409

[51] Int. Cl.⁴ .......................... F16D 3/12; F16D 27/14
[52] U.S. Cl. .................................... 192/84 R; 74/574; 188/218 A; 192/30 V; 192/107 R
[58] Field of Search ............... 192/30 V, 84 R, 107 R; 188/218 A; 74/574

[56] References Cited

U.S. PATENT DOCUMENTS

| 2,338,470 | 1/1944 | Urquhart et al. ..................... 74/574 |
| 2,739,683 | 3/1956 | Gamundi ........................... 192/30 V |
| 2,904,138 | 9/1959 | Wilson . | |
| 2,921,659 | 1/1960 | Gutmann ........................ 192/107 R |
| 2,998,877 | 9/1961 | Ryba ........................... 192/107 R X |
| 3,085,667 | 4/1963 | Lang ............................ 192/107 R X |
| 3,378,116 | 4/1968 | Hennig . | |
| 3,543,901 | 12/1970 | Lengsfeld et al. ............... 192/107 R |

FOREIGN PATENT DOCUMENTS

| 2517718 | 11/1976 | Fed. Rep. of Germany . | |
| 1154469 | 11/1957 | France ............................. 192/84 R |
| 31311 | 3/1977 | Japan . | |
| 0139112 | 12/1978 | Japan ............................ 192/107 R |
| 0139114 | 12/1978 | Japan ............................. 192/30 V |
| 0020079 | of 1901 | United Kingdom ........... 192/107 R |
| 0241741 | 10/1925 | United Kingdom ........... 192/107 R |

Primary Examiner—Rodney H. Bonck
Attorney, Agent, or Firm—Oblon, Fisher, Spivak, McClelland & Maier

[57] ABSTRACT

A movable disc for a friction type electromagnetic clutch/brake is designed for preventing the production of grating sounds from the movable disc. The movable disc includes a rotary armature being movable in a predetermined direction by the application of electromagnetic force, a friction material stuck onto one side surface of the rotary armature, an elastic member supported on one side surface of the rotary armature to the side opposite to the friction material, a face plate fitted to the rotary armature so as to urge the elastic member to the rotary armature. Perforations are formed in the face plate to reduce its mass and the surface area contacting to the elastic member thereby attaining a rapid start up and good periodic damping characteristic.

11 Claims, 13 Drawing Figures

FIGURE 1 *PRIOR INVENTION*
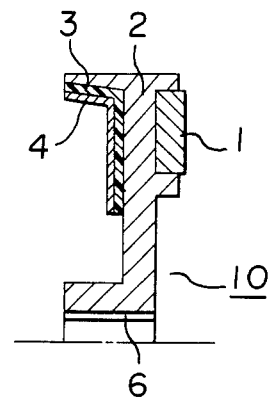
FIGURE 2
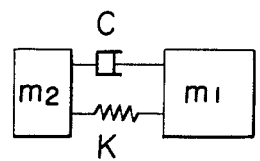

(A)
PRIOR INVENTION (B) PRIOR INVENTION

PRIOR INVENTION

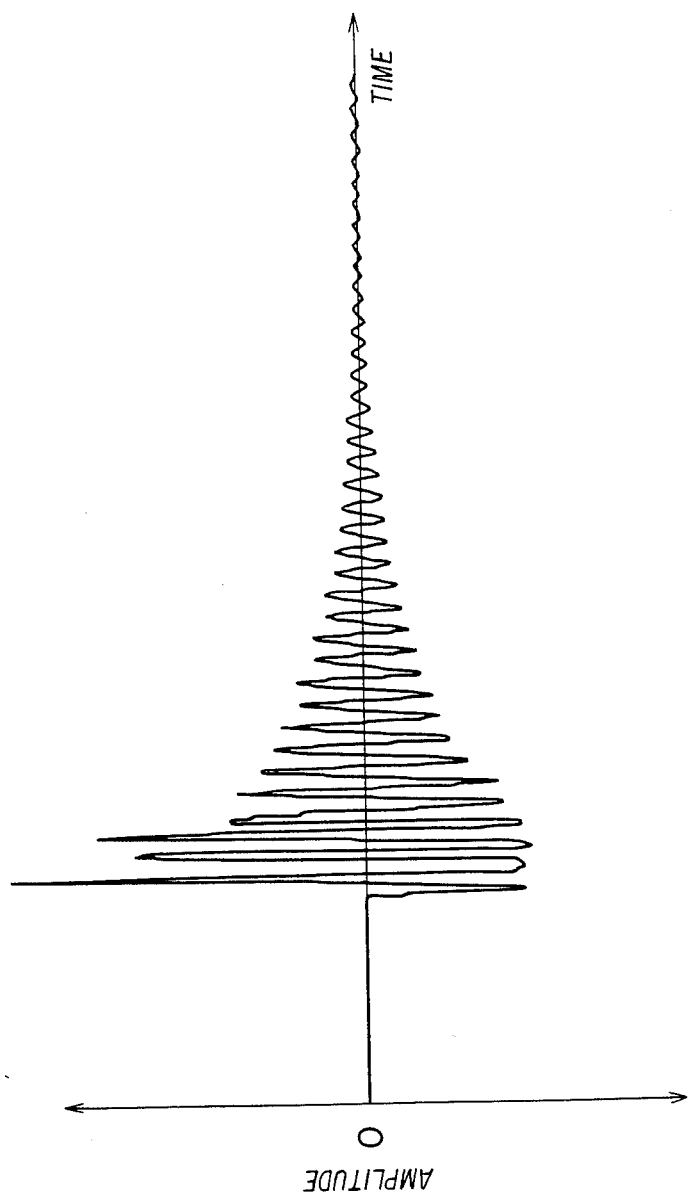

MOVABLE DISC FOR ELECTROMAGNETIC CLUTCH/BRAKE

This invention relates to the prevention of grating sounds from a movable disc for a friction type electromagnetic clutch/brake. In particular, this invention is concerned with the prevention of grating sounds from a movable disc for a friction type electromagnetic clutch/brake, in which the clutch and brake functions are performed by axial movement of the movable disc per se without flexing thereof at the time of operation.

In general, the grating phenomenon caused by the frictional type electromagnetic clutch and brake is such that a disagreeable sound is produced at the time of operation of the frictional type electromagnetic clutch and brake, which may or may not occur depending on the condition of the frictional surface, and other factors. However, in a device such as a driving gear for a sewing machine, where an operator sits to work by the side of the machine, a great deal of annoyance and uneasiness are given to him or her, once such grating sound generates.

As measures for preventing this kind of the grating sound which have so far been practiced, there may be exemplified a Japanese Unexamined Patent Publication No. 31311/1977. This will be explained in reference to FIG. 1 of the accompanying drawing. In the drawing, a reference numeral 1 designates a friction material attached to a rotary armature 2, a reference numeral 3 indicates an elastic material stuck onto the above-mentioned rotary armature 2 on the side opposite to that where the friction material 1 is stuck, and a numeral 4 refers to a face plate made of a metal material and attached to the above-mentioned elastic material 3. A numeral 10 denotes generally a movable disc constructed with the friction material 1, the rotary armature 2, the elastic material 3, and the face plate 4 made of metal material. A reference numeral 6 designates a spline cut in and along the inner peripheral side of the rotary armature 2. By this spline 6, the movable disc 10 moves on and along the spline (not shown specifically in the drawing) provided on the output shaft in its axial direction, thereby functioning as the clutch or brake.

This construction may be illustrated in FIG. 2 of the accompanying drawing, wherein a spring constant of the elastic material 3 is denoted by K, the viscous damping coefficient thereof is denoted by C, and a mass of the face plate 4 made of a metal material is denoted by $m_2$. Incidentally, $m_1$ refers to a mass of the rotary armature 2.

In the following, explanations will be given as to the function of preventing the grating sound in this conventional practice. This conventional practice is to attain the grating sound preventing effect by attaching a vibration damper in a sheet form comprising the elastic material 3, and the face plate 4 made of metal material and stuck onto the elastic material 3 to a member made up of the rotary armature 2 taking part in the frictional movement and the friction material 1 stuck onto the rotary armature 2, and by improving the periodic damping of the member in utilization of its viscous damping. This construction is shown in FIG. 2. As mentioned in the above-referred-to Japanese Unexamined Patent Publication No. 31311/1977, the mass $m_2$ becomes extremely small in the absence of the face plate 4 made of metal material, whereby the periodic damping property decreases considerably. This is obvious from the theory of vibration based on this model.

When a certain exciting force is applied to the above-mentioned movable disc 10 based on the theory of this conventional example, its periodic damping becomes as shown in FIGS. 3 derived as the result of experiments. It has further been shown experimentally that, in the absence of the face plate 4 made of metal material, the periodic damping thereof becomes as shown in FIG. 4.

In FIGS. 3 and 4 of the accompanying drawing, the axis of ordinate denotes the amplitude, and the axis of abscissa the time. From these graphical representations, it may be noted that the periodic damping is quicker in FIG. 3 than in FIG. 4. That is to say, it can be affirmed that the mass $m_2$ of the face plate 4 made of metal material makes a great contribution to the periodic damping in this case.

One of the measures for preventing the movable disc for the conventional electromagnetic clutch/brake from producing the grating sound is practiced in the afore-described construction. Accordingly, when an attempt is made to quicken the periodic damping and to improve the preventing effect against the grating sound for the reason that, when the mass $m_2$ of the face plate 4 made of metal material is too small, the periodic damping of the face plate is slow and no effect of preventing the grating sound can be obtained, the mass of the face plate 4 made of metal material becomes inevitably large to result in an increased inertia of the movable disc 10 as a whole.

According to such conventional practice, there was inevitably such a disadvantage that, in a motor equipped with an electromagnetic clutch/brake which is used in an apparatus, e.g., a sewing machine driving device, which is required to have a fast start up, the inertia at the output side becomes large, owing to which such a fast start up cannot be obtained.

As another measure for preventing this sort of grating sound, there has so far been practiced such one as shown in FIG. 5. In the drawing, a reference numeral 1 designates a friction material stuck onto a rotary armature 2, a numeral 3 refers to a rubbery elastic material stuck on the above-mentioned rotary armature 2 on the side surface opposite to the above-mentioned friction material 1, and a numeral 4 refers to a face plate made of a metal material for preventing the rubbery elastic member 3 from exfoliating from the rotary armature 2 due to influence of heat generated therefrom, and which covers the entire free surface of the rubbery elastic member 3. A reference numeral 5 designates a threaded screw for securing the face plate made of metal material to the rotary armature ring 2. The face plate of metal 4 and the rubbery elastic member 3 are not stuck together. A reference numeral 10 generally denotes the movable disc comprising the rotary armature 2, the rubbery elastic member 3, the face plate 4 made of metal material, and the threaded screw 5. A reference numeral 6 designates a spline cut in and along the inner peripheral side of the rotary armature 2. By this spline 6, the movable disc 10 moves on and along the spline (not shown specifically in the drawing) provided on the output shaft in its axial direction, thereby functioning as the clutch or brake.

In the following, explanations will be given as to the function of preventing the grating sound in this conventional practice. This conventional measure, instead of sticking the elastic member 3 and the face plate 4 of metal material together as in the conventional practice according to the afore-mentioned Japanese Unexamined Patent Publication No. 31311/1977, utilizes the above-mentioned threaded screw 5 for directly connecting the face plate 4 of metal material to the rotary armature 2.

Therefore, in respect of the afore-described periodic damping, the face plate 4 of metal material is not stuck to the above-mentioned elastic member 3, on account of which the mass m2 in FIG. 2 becomes extremely small, and its periodic damping property is remarkably reduced. When a certain exciting force is applied to the above-mentioned movable disc 10 of the conventional example shown in FIG. 5, its periodic damping has been shown experimentally to become as illustrated in FIG. 6.

In FIG. 6, the ordinate axis denotes the amplitude, and the abscissa denotes the time. It is seen from these graphical representations that the periodic damping is very similar in pattern to that of the conventional example according to the Japanese Unexamined Patent Publication No. 31311/1977 as shown in FIG. 4, devoid of the face plate 4 of metal material.

That is to say, according to the conventional example shown in FIG. 5, it can be said that only the rubbery elastic member 3 contributes to the periodic damping, and the face pate 4 made of metal material does not contribute to the periodic damping whatsoever.

This other measure of preventing the grating sound of the movable disc for the electromagnetic clutch and brake is constructed as mentioned in the foregoing.

In this case, therefore, the periodic damping is slow, and the preventive effect against the grating sound is reduced. Further, since the face plate 4 of metal material is mounted for preventing the rubbery elastic member 3 from peeling off the rotary armature 2, the inertia of the movable disc 10 as a whole is increased. In such a conventional example, there were various disadvantages such that no satisfactory rotational start up characteristic can be obtained in an apparatus such as, for example, a sewing machine driving device, which is required of having rapid rotational start up and a performance of producing no grating sound, because of increasing inertia at the output side thereof, and that the device cannot be made in a construction which is rather difficult to produce the grating sound.

The present invention has been made with a view to removing those various disadvantages inherent in the conventional devices as mentioned in the foregoing, and aims at providing a movable disc for an electromagnetic clutch and brake which is suitable for a motor for an apparatus such as, for example, a sewing machine driving device, required to have small inertia, a quick periodic damping, a rapid rotational start up characteristic with a high preventative effect against the grating sound, and a performance of not producing the grating sound.

According to the present invention, in general aspect thereof, there is provided a movable disc for an electromagnetic clutch and brake which comprises in combination: a rotary armature; a friction material stuck onto one side surface of said rotary armature; and an elastic member made of rubber, etc., supported, not by an adhesive, on the other surface of said rotary armature in a state of its being urged with a face plate made of a metal material which is relatively hard and does not cover the entire free surface of the elastic member.

FIG. 1 is a cross-sectional view showing a conventional movable disc;

FIG. 2 is a schematic diagram showing the conventional embodiment in model of FIG. 1;

FIGS. 5A and 5B illustrate another conventional movable disc, in which FIG. 5A is a partial front view and FIG. 5B is a cross-sectional view;

FIGS. 7A and 7B illustrate one embodiment of the movable disc according to the present invention, in which FIG. 7A is a front view and FIG. 7B is a cross-sectional view;

FIG. 8 is a periodic damping characteristic diagram of the movable plate in one embodiment according to the present invention as shown in FIG. 7.

FIGS. 9A and 9B illustrate another embodiment of the movable disc according to the present invention, in which FIG. 9A is a front view and FIG. 9B is a cross-sectional view.

Figure 7A:
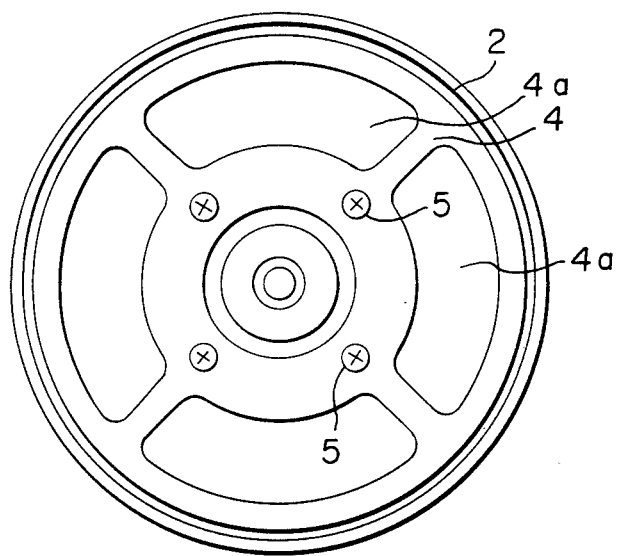
Figure 7B:
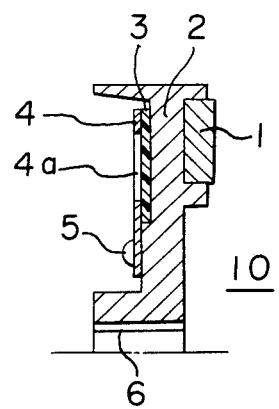

In the following, the present invention will be described in detail in reference to FIG. 7 showing one preferred embodiment of the present invention.

In the drawing, a reference numeral 1 designates a friction material stuck onto a cup-shaped rotary armature 2, a numeral 3 refers to a ringed elastic member made of rubber material, and a numeral 4 represents a face plate made of a metal material, which has a shape sufficient to cover the elastic member, and a reference numeral 4a designates perforations formed in the face plate 4 made of metal material at a predetermined interval in the circumferential direction, the perforations in this embodiment being four in total.

The elastic member 3 made of the rubber material is supported on one side surface of the above-mentioned rotary armature 2 to the side opposite to that where the above-mentioned friction material 1 is stuck, in a state of its being urged by the face plate 4 made of metal material and having the perforations 4a formed therein. The elastic member 3 made of rubber material is stuck neither to the above-mentioned rotary armature 2 nor to the face plate 4 made of metal material. A reference numeral 5 designates threaded screws for attaching the face plate 4 made of metal material to the rotary armature 2. A reference numeral 10 generally represents the movable disc made up of the friction material 1, the rotary armature 2, the elastic member 3 made of rubber material, the face plate 4 made of metal material, and the threaded screws 5. A reference numeral 6 represents a spline cut in and along the inner peripheral side of the rotary armature 2. The movable disc 10 is moved by the application of electromagnetic force on and along the spline (not shown specifically in the drawing) provided on the output shaft in its axial direction to function as the clutch or brake.

Figure 3:
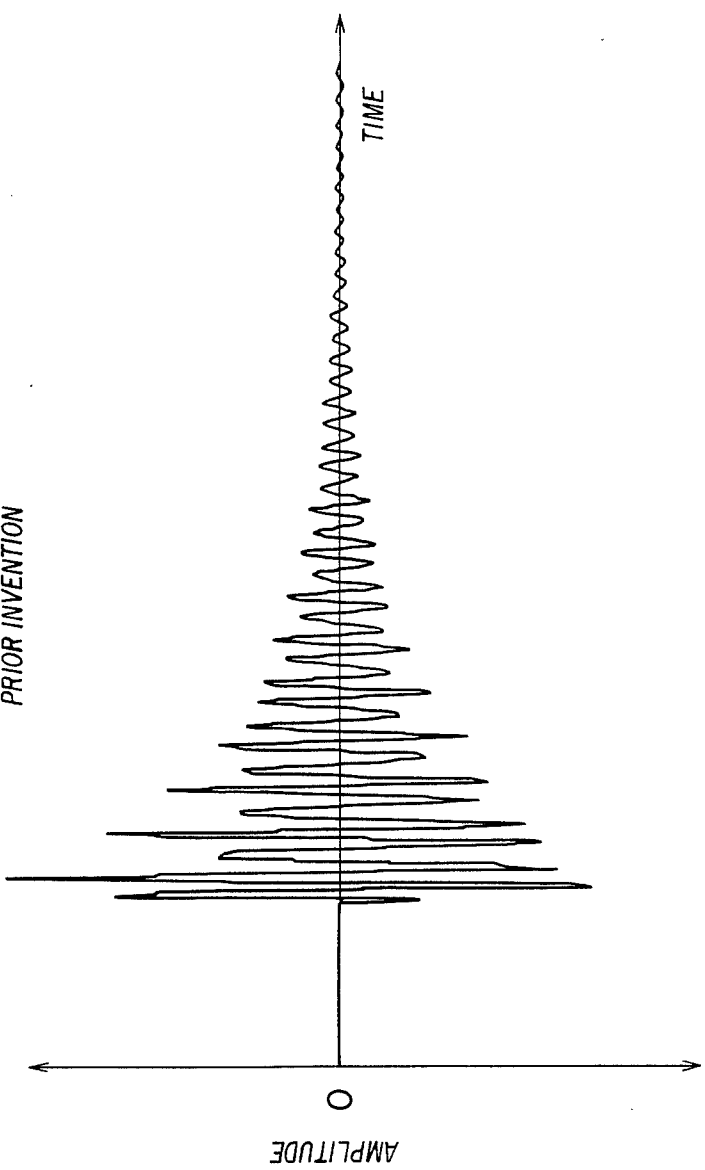
FIG. 3 is a characteristic diagram showing the periodic damping of the conventional movable disc shown in FIG. 1.
Figure 4:
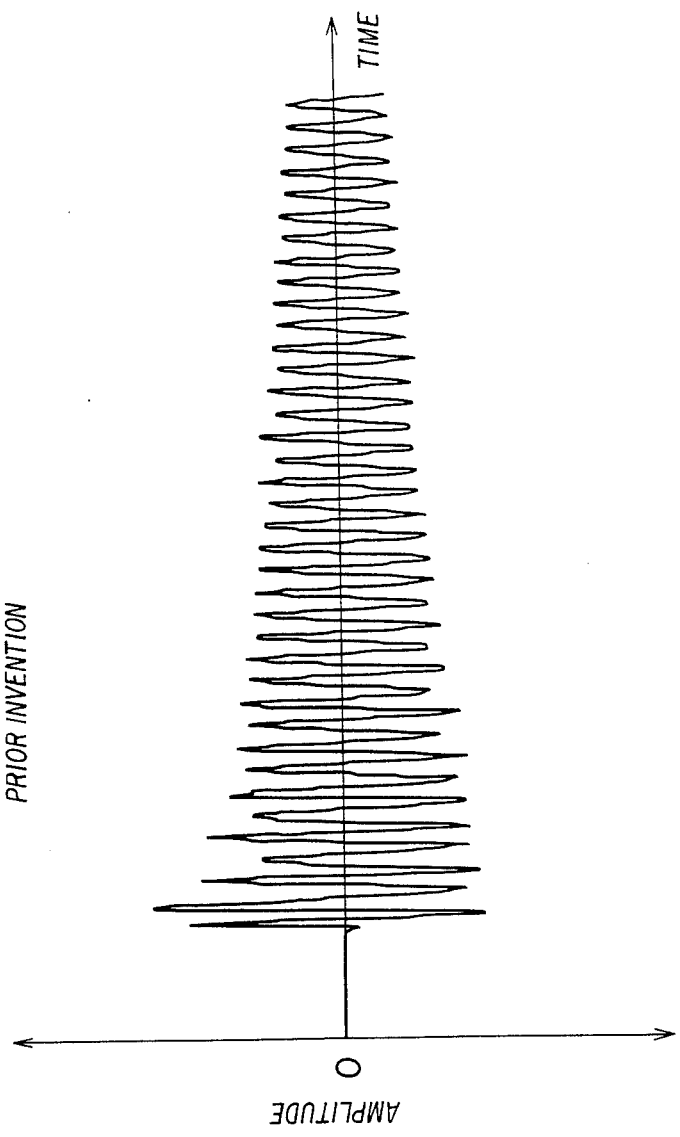
FIG. 4 is also a characteristic diagram of the periodic damping of the conventional movable disc shown in FIG. 1, having no metal plate provided thereon.

In this preferred embodiment of the present invention which is of the construction as mentioned in the foregoing, the face plate 4 made of metal material may suffice to urge the elastic member 3 made of rubber material only partially, and the perforations 4a can be formed in the inner peripheral side thereof with the result that the inertia of the movable disc 10 as a whole can be made small. Further, it has been verified experimentally that, when a certain exciting force is applied to the movable disc 10, its periodic damping becomes as shown in FIG. 8. In FIG. 8, the abscissa represents the amplitude and the ordinate denotes the time. This periodic damping characteristic in this graphical representation is very similar in its pattern to the conventional embodiment according to the Japanese Unexamined Patent Publication No. 31311/1977 as shown in FIG. 3, which is quicker in its periodic damping than that as shown in FIG. 4 in the case of the face plate 4 of the conventional embodiment according to the Japanese Unexamined Patent Publication No. 31311/1977 with no face plate 4 made of the metal material being provided thereon, or than that as shown in FIG. 6 in the case of the other conventional embodiment according to FIG. 5. Therefore, the movable plate of this invention is highly effective for preventing the grating sound from occurring.

Figure 5:
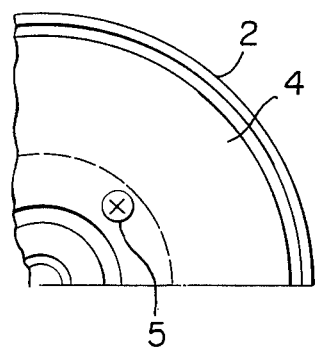
Figure 5:
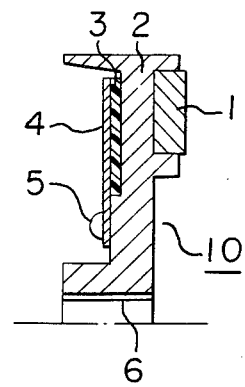
Figure 6:
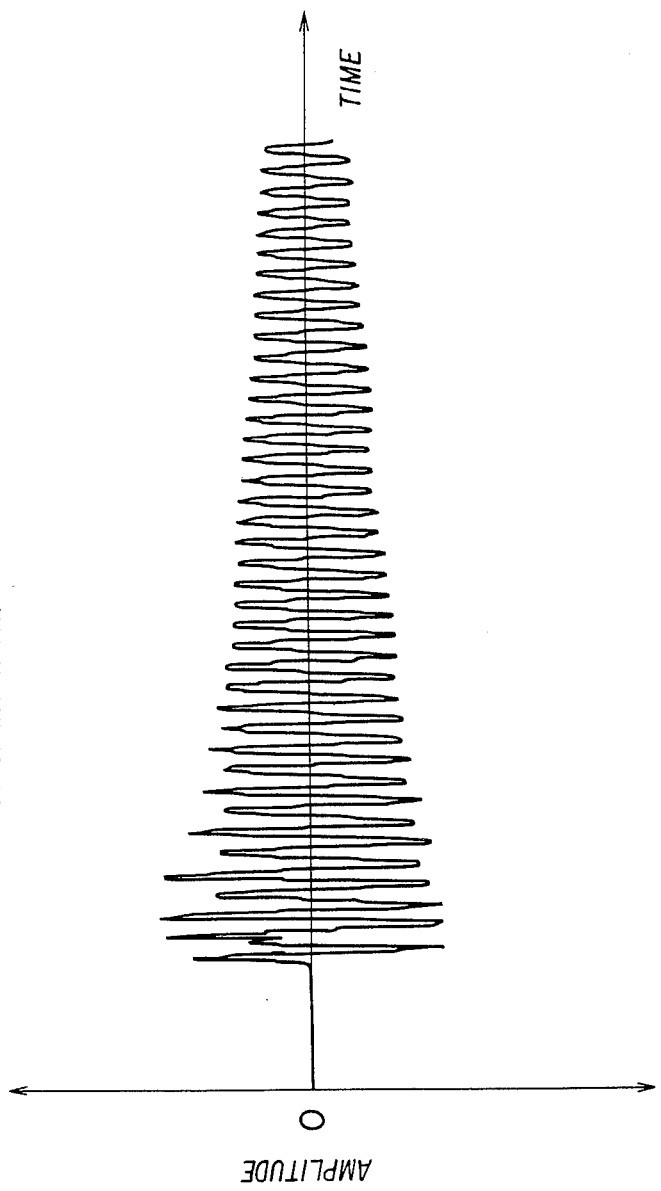
FIG. 6 is a characteristic diagram showing the periodic damping of the conventional movable disc shown in FIGS. 5A and 5B.

Further, this embodiment does not require sticking of the elastic member 3 to the rotary armature 2 as in the conventional embodiments shown in FIGS. 1 and 5, which contributes to saving additional work, hence to a reduced manufacturing cost.

Figure 9A:
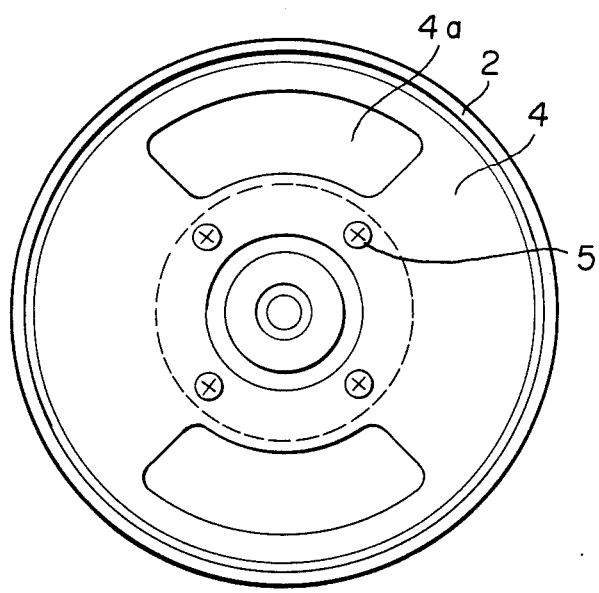
Figure 9B:
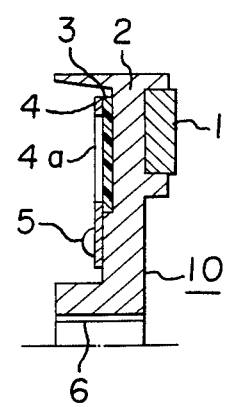

FIGS. 9A and 9B illustrate another embodiment of the movable disc for the electromagnetic clutch and brake according to the present invention. The point of difference in this embodiment from the above-described embodiment shown in FIG. 7 consists in that the perforations 4a are formed in pair and arranged at symmetrical positions in the face plate 4. The remaining construction is the same as that of the FIG. 7 embodiment.

Figure 10:
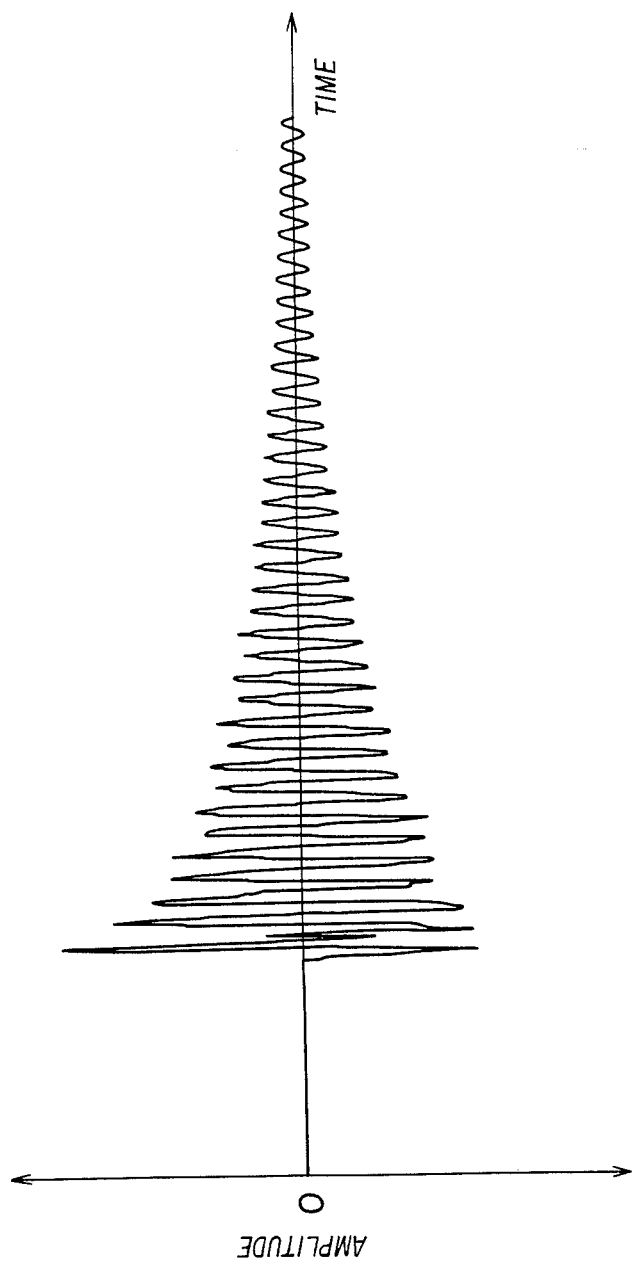
FIG. 10 is a periodic damping characteristic diagram of the movable disc in another embodiment of the present invention as shown in FIGS. 9A and 9B.

It has been found by experiments that the periodic damping of the embodiment shown in FIG. 9 becomes as shown in FIG. 10. As seen from the graphical representation in FIG. 10, the periodic damping of this embodiment shown in FIG. 9 with a pair of perforations 4a being formed in the face plate 4 is quite similar to the periodic damping of the conventional example according to Japanese Unexamined Patent Publication No. 31311/1977 as shown in FIG. 3, which is quicker than the periodic damping of the conventional examples shown in FIGS. 4 and 6, giving a real effect in preventing the grating sound from occurring.

Incidentally, the reason for the better periodic damping (shown in FIG. 8) of the embodiment as illustrated in FIG. 7 than the periodic damping (shown in FIG. 10) of the embodiment illustrated in FIG. 9 appears to be resulted from small inertia of the face plate 4 in the FIG. 7 embodiment owing to more number of the perforations 4a.

Although no clear explanations can be given on the basis of the theory of vibration it may be definitely said that, since the periodic damping characteristic has been improved by reducing the inertia of the face plate 4 made of metal material, the theory of vibration is apparently different from that of the conventional example according to the Japanese Unexamined Patent Publication No. 31311/1977 as shown in FIG. 1.

Further, in the above-described embodiment, the elastic member is made of rubber, although any other elastic material similar to rubber such as, for example, cork, etc. may be equally used. In the same manner, the face plate for urging the elastic member may not only be made of a metal material, but also it may be made of any material having hardness similar to that of the metal material, such as, for example, synthetic resins. In other words, it may suffice to say that the face plate meets the characteristic that is able to urge the elastic member in position, and it can improve its periodic damping characteristic, even if its mass is light, to exhibit satisfactory preventative effect against the grating sound, hence the inertia of the movable disc as a whole can be made small.

As stated in the foregoing, since the present invention is so designed that the elastic member is urged by the face plate, there is no necessity for sticking the elastic member on either of the face plate and rotary armature, which contributes to reduction in the manufacturing cost. In addition, the face plate may be sufficient to urge only a part of the entire elastic member, and perforations may be formed in the inner peripheral side thereof. As the consequence of this, there can be provided a movable disc for the electromagnetic clutch and brake suitable for those apparatuses and appliances such as, for example, a motor of a sewing machine driving device, which are required of having small inertia, quicker periodic damping characteristic, high preventive effect against the grating sound, a rapid start up characteristic, and performance of not producing the grating sound.

I claim:

1. A movable disc for an electromagnetic clutch/-brake, comprising:
   an armature mounted for rotation about an axis and movement along said axis, said armature having opposite first and second axially spaced surfaces;
   a friction material attached to said first surface;
   an annular elastic member supported and held with one side in contact with said second surface and in a position coaxial with said armature;
   a face plate formed of a material harder than that of said elastic member, said face plate being attached directly to said armature and being in contact with another side of said elastic member for supporting and holding said elastic member in contact with said armature, said face plate having perforations constructed and positioned such that a surface area of said face plate contacting said elastic member is smaller than a surface area of said another side of said elastic member, whereby the mass of said face plate is reduced.

2. A movable disc for an electromagnetic clutch/-brake according to claim 1 wherein said rotary armature is a cup-shaped rotary armature.

3. A movable disc for an electromagnetic clutch/-brake according to claim 1 wherein said friction material is annular and is positioned at a radially outer periphery of said rotary armature.

4. A movable disc for an electromagnetic clutch/-brake according to claim 1 wherein said elastic member is made of rubber.

5. A movable disc for an electromagnetic clutch/-brake according to claim 1 wherein said elastic member is made of cork.

6. A movable disc for an electromagnetic clutch/-brake according to claim 1 wherein said face plate is made of metal material.

7. A movable disc for an electromagnetic clutch/-brake according to claim 1 wherein said face plate is made of synthetic resin.

8. A movable disc for an electromagnetic clutch/-brake according to claim 1 wherein said face plate is attached to said armature by threaded screws.

9. A movable disc for an electromagnetic clutch/-brake according to claim 1 wherein said face plate is annular and coaxial with said armature and is provided with a plurality of perforations in a symmetrical position with respect to said axis.

10. The movable disc of claim 1 including four of said perforations.

11. The movable disc of claim 1 including means for attaching said face plate directly to said armature, said means comprising a plurality of threaded screws arranged along a locus centered on said axis.

* * * * *